(12) United States Patent
Kurita et al.

(10) Patent No.: US 7,040,440 B2
(45) Date of Patent: May 9, 2006

(54) ELECTRIC ASSISTED BICYCLE

(75) Inventors: Masahiro Kurita, Mie-ken (JP); Hiroji Fukuoka, Osaka-fu (JP); Naoki Obita, Osaka-fu (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/797,611

(22) Filed: Mar. 11, 2004

(65) Prior Publication Data

US 2004/0231905 A1 Nov. 25, 2004

(30) Foreign Application Priority Data

Mar. 11, 2003 (JP) .............................. 2003-65266

(51) Int. Cl.
*B62D 61/02* (2006.01)

(52) U.S. Cl. .................... 180/205; 180/220; 192/17 R; 192/217

(58) Field of Classification Search ...... 180/65.1–65.3, 180/218–220, 205; 192/217, 217.2, 12 B, 192/17 R
See application file for complete search history.

(56) References Cited

U.S. PATENT DOCUMENTS 4,637,274 A * 1/1987 Goldenfeld ................... 74/625
6,157,149 A * 12/2000 Ohnuma ....................... 318/139

FOREIGN PATENT DOCUMENTS

JP          2001-213383          8/2001

* cited by examiner

*Primary Examiner*—Lesley D. Morris
*Assistant Examiner*—L. Lum
(74) *Attorney, Agent, or Firm*—Arent Fox PLLC

(57) ABSTRACT

An electric assisted bicycle of simple structure is provided which is superior in the stability, reliability, and certainty of operation, and is provided with an electric power regenerative function and a brake assist function. A pedal force transmitted from a crank shaft is transmitted to an axle shaft via first transmission means, and the output of a motor as an assistant motive power is transmitted to the axle shaft via a clutch unit, which can switch a lock direction in conjunction with brake operation by a cyclist, and second transmission means.

21 Claims, 12 Drawing Sheets

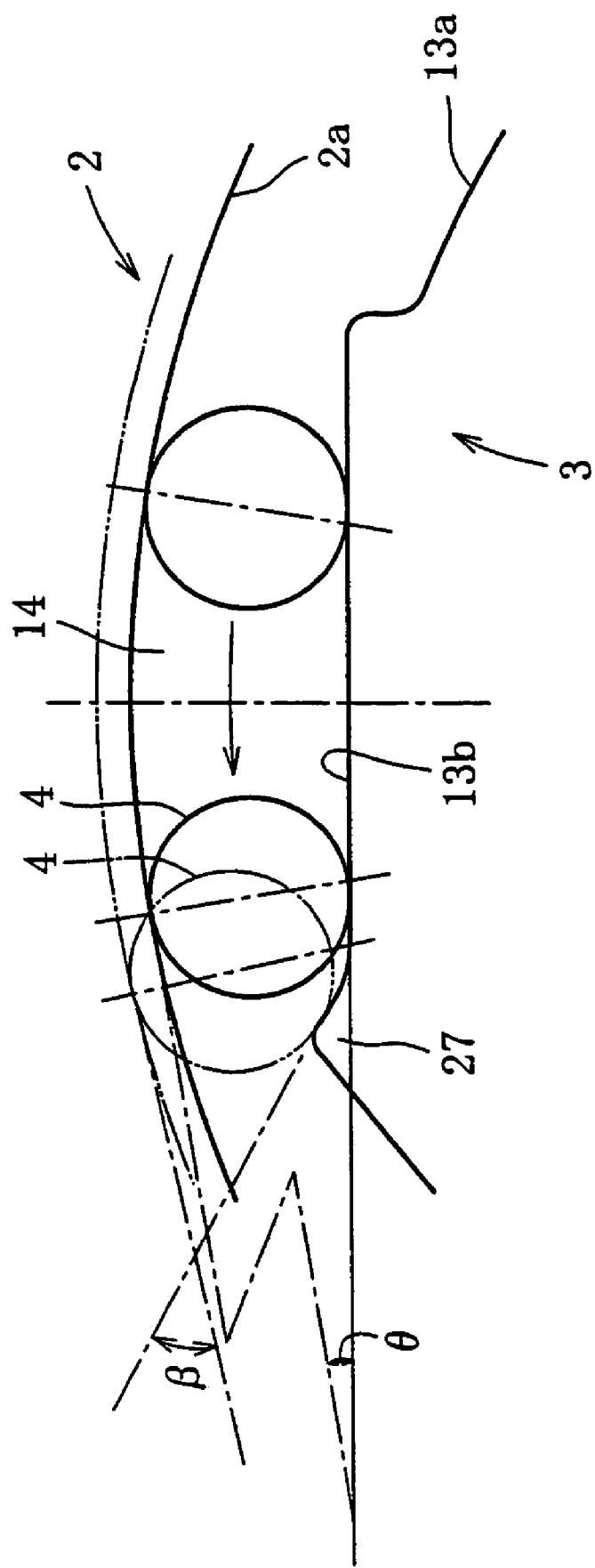

ELECTRIC ASSISTED BICYCLE

BACKGROUND OF THE INVENTION

1. Field of the Invention

The present invention relates to an electric assisted bicycle which uses motor output as assistant motive power.

2. Description of the Related Art

An electric assisted bicycle, which carries out assist cycling by use of motor output during flat road and uphill runs, is provided with a battery as a power source of a motor. However, naturally there is a limit to distance run per electric charge, so that the expansion of mileage is greatly desired.

To respond to the desire, Japanese Patent Laid-Open Publication No. 2001-213383 (hereinafter called prior invention), for example, discloses invention in which the rotation of a wheel during applying a brake regeneratively generates electric power, and the battery is charged by regenerative current. In the prior invention, the rotation of a motor drive section is transmitted to the rear wheel via a one way clutch such as a ratchet mechanism or the like, and direct coupling means directly couples the one way clutch in response to the bias of brake means for braking the rear wheel.

Generally in a case where the one way clutch is interposed between the wheel and the motor, torque is transmitted from the motor to the wheel during cycling assisted by the motor, but the direction of torque transmission is reversed and torque is transmitted from the wheel to the motor under braking, so that the one way clutch idles. Without devising any measure, the torque is not transmitted to the motor and electric power cannot be generated in this state. In order to solve this problem, a friction clutch unit is provided in the above prior invention as direct coupling means, in which frictional force transmits the torque from an output side to an input side by means of pressing a clutch plate (denoted by the reference numeral 86 in the patent publication) against a member on the output side and a member on the input side.

Using this type of direct coupling means, however, complicates structure, because another clutch unit becomes necessary in addition to the one way clutch. Also, the friction clutch unit lacks the stability and reliability of operation due to its frictional structure.

SUMMARY OF THE INVENTION

An object of the present invention is to provide an electric assisted bicycle of simple structure which is superior in the stability, reliability and certainty of operation, and is provided with an electric power regenerative function and a brake assist function.

To achieve the above object, according to the present invention, in an electric assisted bicycle in which a pedal force transmitted from a crank shaft and the output of a motor are transmitted to an axle shaft, a clutch unit which can switch a lock direction in conjunction with brake operation by a cyclist is coupled to the output shaft of the motor.

According to the structure described above, since the clutch unit is locked in a normal rotational direction during motor assist, the output of the motor is transmitted to the axle shaft, and hence the motor assist becomes possible. By switching the lock direction in conjunction with the brake operation by the cyclist, and locking the clutch unit in a reverse rotational direction, reverse input torque from the side of the axle shaft (a normal rotational direction) is transmitted to the motor, and hence both of the regenerative electric power generation and the brake assist become possible. Each operation described above is carried out by the single clutch unit, so that it is possible to miniaturize a drive section of the electric assisted bicycle and reduce the cost thereof, as compared with a conventional electric assisted bicycle which requires an extra clutch unit.

Specifically, each function described above is implemented by (1) coupling the crank shaft to the axle shaft via first transmission means and rigidly coupling the output shaft of the clutch unit to the axle shaft via second transmission means (refer to FIGS. 6(*a*) and 6(*b*)), (2) rigidly coupling the output shaft of the clutch unit to the axle shaft via transmission means and coupling the crank shaft to the output shaft of the clutch unit (refer to FIGS. 7(*a*) and 7(*b*)), or (3) rigidly coupling the output shaft of the clutch unit to the axle shaft via transmission means and coupling the crank shaft to the axle shaft via said transmission means (refer to FIGS. 8(*a*) and 8(*b*)).

In this case, to prevent the rotation of the axle shaft from being transmitted to a pedal via the crank shaft during the operation of a brake, it is preferable to interpose a one way clutch between the first transmission means and the axle shaft in the case of (1), to interpose a one way clutch between the crank shaft and the output shaft of the clutch unit in the case of (2), and to interpose a one way clutch between the crank shaft and the transmission means in the case of (3).

The above clutch unit comprises an input side member to which motor torque in the normal rotational direction is inputted, an output side member to which the torque is outputted, a plurality of engaging elements disposed between the input side member and the output side member, and a plurality of cam faces which cause each engaging element to be engaged with the input side member and the output side member in a wedge-like manner, and the unit switches the lock direction of the clutch unit from the normal rotational direction to the reverse rotational direction in conjunction with the brake operation by the cyclist. This clutch unit is used with being switched into any of a normal rotational direction locked state and a reverse rotational direction locked state.

With the use of the clutch unit which transmits torque by the action of wedge-like engagement of the engaging elements and switches the wedge-like engagement direction of the engaging elements from the normal rotational direction to the reverse rotational direction, it is possible to increase the stability, reliability, and certainty of operation, as compared with a case of using a friction clutch unit. The engaging elements are members which can be engaged with the input side member and the output side member in a wedge-like manner, and sprags may be used as the engaging elements instead of the rollers. The cam face may be formed in any of the input side member and the output side member. Generally, one of the input side member and the output side member is disposed on the outer diameter side of the other.

The lock direction of the clutch unit is switched by holding the engaging elements by a cage and applying a delay in rotation to the cage with respect to the input side and output side members in conjunction with the brake operation by the cyclist, so that it is possible to obtain high stability of operation with a simple structure. In order to apply the delay in rotation, for example, a brake member is used to be pressed against the cage.

In this case, it is preferable that the engaging elements are constantly biased to the normal rotational direction with an elastic force applied to the cage.

The plurality of cam faces of the clutch unit causes the engaging elements to be engaged with the input side member and the output side member in both normal and reverse rotational directions in a wedge-like manner. Thus, when the engaging elements are engaged in the normal rotational direction in a wedge-like manner, the clutch unit is locked in the normal rotational direction, and torque is transmitted from the input side member to the output side member. When the engaging elements are engaged in the reverse rotational direction in a wedge-like manner, on the other hand, the clutch unit is locked in the reverse rotational direction, and reverse input torque from the output side member in the normal rotational direction can be transmitted to the input side member.

If the clutch unit transmits reverse input torque from an output side to an input side when the reverse input torque from the output side member is equal to, or less than, a predetermined value whereas the clutch unit interrupts the transmission of torque from the output side to the input side when the reverse input torque exceeds the predetermined value, it is possible to add a function as a torque limiter to the clutch unit. Thus, when reverse input torque is transmitted to the motor, it is prevented that impulsive load due to the hard acceleration of the stopped motor damages a component such as the motor and the like.

This function is obtained when the clutch unit is provided with, as the plurality of cam faces, first cam faces which cause the engaging elements to be engaged with the input side member and the output side member in a wedge-like manner only in the normal rotational direction, and second cam faces which cause the engaging elements to be engaged with the input side member and the output side member in a wedge-like manner in both normal and reverse rotational directions.

In other words, during the motor assist, the first and second cam faces cause the engaging elements to be engaged with the input side member and the output side member in a wedge-like manner in the normal rotational direction, to transmit the output of the motor to the axle shaft. During the brake operation, on the other hand, only the second cam faces cause the engaging elements to be engaged in a wedge-like manner in the reverse rotational direction. In this case, since decrease in the number of wedge-like engaging points increase load in each engaging point, the input side member or the output side member is easily deformed. The deformation increases the cam angle between the engaging element and the second cam face. When the reverse input torque is excessive, the cam angle becomes a lock angle or larger than that to lose the lock function, and hence the transmission of the torque to the input side is prevented.

The loss of the lock function is realized by, for example, forming the second cam faces in one of the input side and output side members, and deforming the other member by the engaging elements guided by the stopper portions to make the cam angle larger than the lock angle.

In the cam face for causing the engaging element to be engaged with the input side member and the output side member in a wedge-like manner in both normal and reverse rotational directions, if the angle between the lock position of the engaging element in the normal rotational direction and the lock position of the engaging element in the reverse rotational direction is set at equal to, or more than, 5 degrees, it is possible to prevent the unintended switching of the lock direction which is caused by the speed variation of a transmission element (for example, a chain) coupled to the output side member or the like.

BRIEF DESCRIPTION OF THE DRAWINGS

FIG. 14 is an enlarged sectional view in the radial direction showing the vicinity of a second cam face of the clutch unit.

DETAILED DESCRIPTION OF THE PREFERRED EMBODIMENTS

An embodiment of the present invention will be hereinafter described on the basis of FIGS. 1 to 14.

Figure 1:
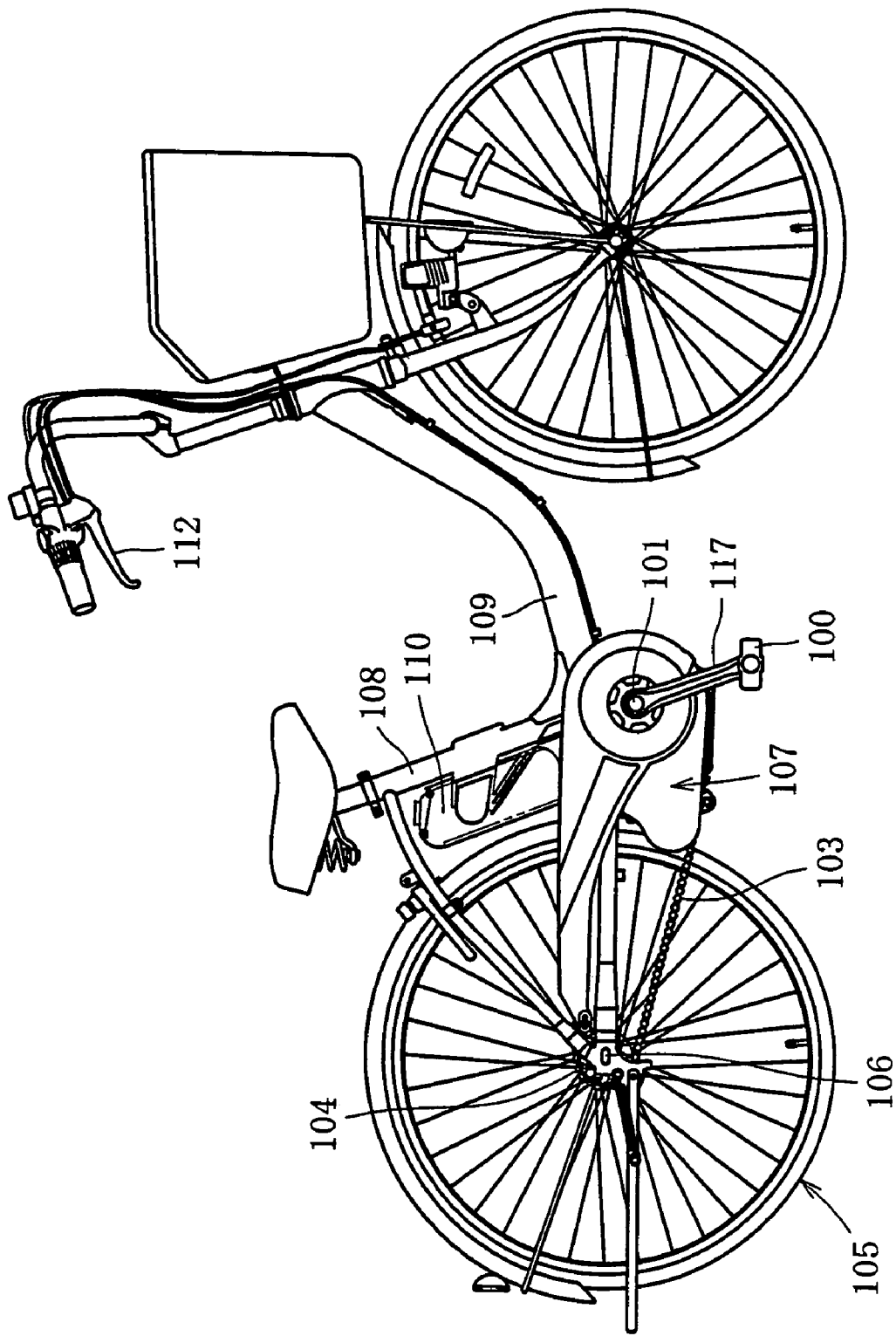
FIG. 1 is a side view of an electric assisted bicycle according to the present invention.

FIG. 1 is a right side view showing an example of an electric assisted bicycle. In the electric assisted bicycle, while a pedal force acting on a pedal 100 is transmitted to an axle shaft 106 of a rear wheel 105 through the channel of a crank shaft 101, a front sprocket 102 (refer to FIGS. 6 to 8), a chain 103, and a rear sprocket 104, motor output is combined as assistant motive power to assist cycling (motor assist). Generally, torque detection means constantly detects torque acting on the crank shaft 101, and when a detection value becomes lower than a predetermined value, a motor is activated to generate torque in accordance with a shortfall as assistant motive power. A motor unit 107 including the motor for assist is generally disposed in the vicinity of the connection portion between the lower end of a seat tube 108 and the rear end of a main tube 109, and a battery 110 for driving the motor is disposed along the seat tube 108.

The present invention is characterized that an output shaft of the motor is coupled to a clutch unit which can switch a lock direction. First, the structure and function of the clutch unit 1 will be hereinafter described.

Figure 2:
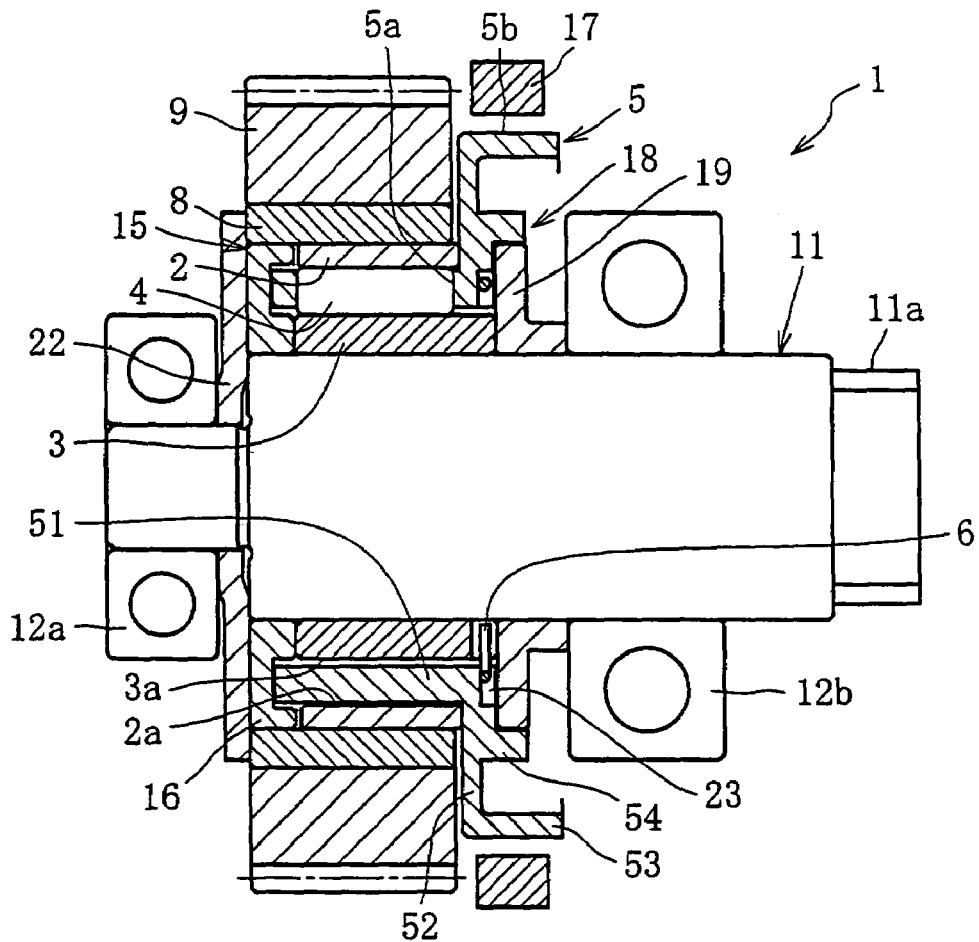
FIG. 2 is a sectional view in an axial direction of a clutch unit used in the electric assisted bicycle.
Figure 3:
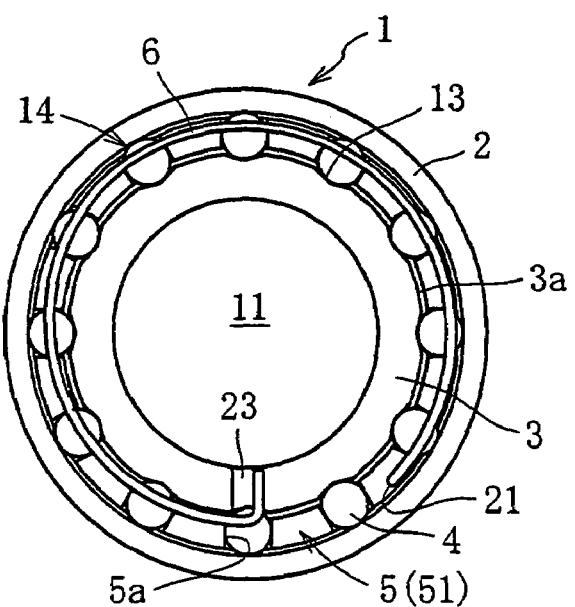
FIG. 3 is a sectional view in a radial direction of the clutch unit.

Referring to FIGS. 2 and 3, the clutch unit 1 mainly comprises an outer ring 2 as an input side member to which torque is inputted from the motor, an inner ring 3 as an output side member which outputs the torque to the wheel, and a plurality of cylindrical rollers 4 (hereinafter simply called "rollers") disposed between the outer ring 2 and the inner ring 3 as engaging elements, a cage 5 for holding the rollers 4 in a plurality of positions at regular intervals in a peripheral direction, and an elastic member 6 for controlling the phase of the cage 5 in a rotational direction.

The outer ring 2 is a ring having an inner periphery 2a in the shape of a cylinder, and a bush 8 is press-fitted on the outer periphery thereof. An input gear 9 is press-fitted on the outer periphery of the bush 8, so that torque from the motor is transmitted to the bush 8 via the input gear 9, and is further transmitted to the outer ring 2. The input gear 9 and the bush 8 may be integrally formed, or the input gear 9, the bush 8, and the outer ring 2 may be integrally formed, as long as the surface hardness of the input gear 9 is ensured.

The inner ring 3 is a ring disposed in the inner periphery of the outer ring 2, and an output shaft 11 is press-fitted into the inner periphery thereof. The output shaft 11 is rotatably held by bearings (for example, ball bearings 12a and 12b) disposed on both sides of the rollers 4 along the axial direction, and a spline 11a is formed in an end of the output shaft 11 to couple with the sprocket in such a manner that torque can be transmitted. The inner ring 3 and the output shaft 11 may be integrally formed as required.

A plurality of cam faces 13 (the number of which is the same as that of the rollers 4) is formed in the outer periphery 3a of the inner ring 3. The cam face 13 is formed in the shape of, for example, "V" in cross section, at the center thereof in a circumferential direction the diameter of the ring becoming a minimum. A wedge clearance 14 is created between the cam face 13 and the inner periphery 2a of the outer ring 2, the width of which in a radial direction is small in both normal and reverse rotational directions. When the roller 4 is in the middle of the wedge clearance 14 in the circumferential direction the roller 4 is rotatable, but when the roller 4 moves to any of the normal or reverse rotational direction and is caused to be engaged with the outer ring 2 and the inner ring 3 (engaged in a wedge-like manner), the outer ring 2 and the inner ring 3 are locked in the rotational direction.

A self-aligning bearing 15 is disposed between the outer ring 2 and the inner ring 3, so that they are securely coaxial with each other. The self-aligning bearing 15 is structured by, for example, fitting a bearing member 16 into the space between the inner periphery of the bush 8 and the outer periphery of the output shaft 11.

The cage 5 is provided with pockets 5a for containing the rollers 4, and the sliding surface 5b which slides on a shoe 17 described later. The cage 5 shown in the drawings is integrally provided with a cage section 51 extending in an axial direction, a flange section 52 extending in the radial direction from one end of the cage section 51, a large-diameter cylindrical section 53 extending in the axial direction from the end of the outside diameter of the flange section 52, and a small-diameter cylindrical section 54 extending in the axial direction from the flange section 52 in an inner diameter side than the large-diameter cylindrical section 53. The pockets 5a are formed in the cage section 51 at regular intervals in the circumferential direction, and the sliding surface 5b is formed in the outer periphery of the large-diameter cylindrical section 53. The clearance between the pocket 5a and the roller 4 is a negative clearance or a positive clearance equal to or less than 1/20 of the diameter of the roller. In the case of the positive clearance, it is preferable to provide a projection in the inner periphery of the pocket of the cage section 51 in such a manner as to protrude in the circumferential direction, for the purpose of preventing the roller 4 from dropping down.

The cage 5 is held by a slide bearing 18 rotatably with respect to the output shaft 11, so that the cage 5 is securely coaxial with the outer ring 2 and the inner ring 3 even if the sliding surface 5b comes into contact with the shoe 17. The slide bearing 18 is structured between the outer periphery of a spacer 19, which is press-fitted or disposed with positive clearance in the ring-shaped clearance between the small-diameter cylindrical section 54 of the cage 5 and the output shaft 11, and the inner periphery of the small-diameter cylindrical section 54.

The shoe 17 as a braking member, which applies braking force to the cage 5 in conjunction with brake operation by a cyclist, is disposed oppositely to the sliding surface 5b of the cage 5, as shown in the drawing. In addition to mechanically interlocking the shoe 17 to the brake lever 112 (refer to FIG. 1) of the bicycle with a wire or the like, the shoe 17 may be interlocked with the brake operation by electric means in which, for example, the state of operation of the brake lever 112 is converted into an electric signal to excite a solenoid based on the signal.

The elastic member 6 is composed of, for example, a ring spring. One end of the elastic member 6 is inserted into a hole 21 provided in the cage section 51 of the cage 5, and the other end thereof is inserted into a notch 23 provided in one end of the inner ring 3, so that the elastic member 6 is interposed between the inner ring 3 and the cage 5. The elastic member 6 is attached to the cage 5 and the inner ring 3, respectively, by expanding or contracting the diameter of the elastic member 6 from a natural state, and after attachment, the cage 5 and the inner ring 3 are shifted in phase in a rotational direction by its elastic force. Therefore, in this state, as shown in FIG. 4, the rollers 4 pushed by the cage 5 are displaced to the normal rotational direction of the wedge clearance 14, that is, to the shrinking side of the rotational direction (clockwise direction in the drawing) of the outer ring 2 by a motor drive.

The reference numeral 22 denotes a washer disposed between the bearing 12 and the shoulder portion of the output shaft 11, in order to prevent the components of the clutch unit 1 from falling off, and to seal the inside of the clutch.

The functions of the clutch unit having the above structure will be hereinafter explained on the basis of FIGS. 4 and 5.

Figure 4:
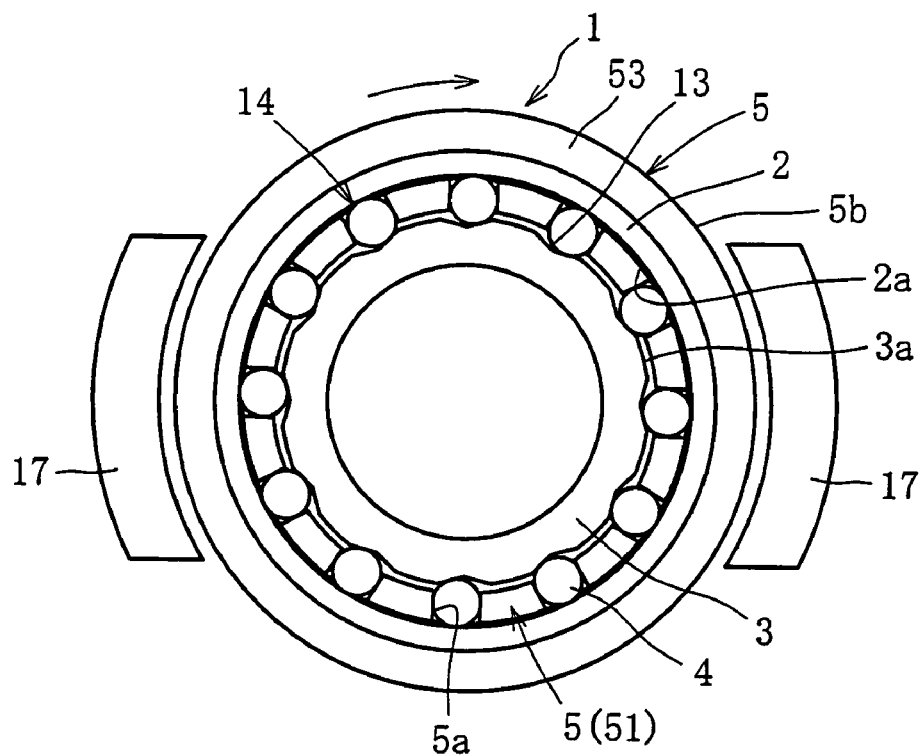
FIG. 4 is a sectional view in the radial direction showing the motor assist state of the clutch unit.

FIG. 4 shows the clutch unit while the motor is driven. In this state, as described above, the rollers 4 are displaced to the shrinking side of the wedge clearance 14 in the normal rotational direction by the elastic force of the elastic member 6. When the outer ring 2 is rotated by applying input torque from the motor in the normal rotational direction to the outer ring 2, the rollers 4 are caused to be engaged with the outer ring 2 and the inner ring 3 in a wedge-like manner, to lock the outer ring 2 and the inner ring 3 in the normal rotational direction. Thus, since the input torque (the normal rotational direction) from the motor is transmitted to the inner ring 3, the output shaft 11 rotates in that direction (this state is hereinafter called "a normal rotation locked state"). In the normal rotation locked state, when reverse input torque in a reverse rotational direction (counterclockwise direction) is applied from the output shaft 11 to the inner ring 3, the rollers 4 are similarly caused to be engaged in a wedge-like manner, and it becomes possible to transmit the torque from the inner ring 3 to the outer ring 2. When input torque or reverse input torque in the other direction is applied, on the other hand, the wedge-like engagement among the rollers 4, the outer ring 2, and the inner ring 3 is released in the wedge clearance, so that the torque is not transmitted.

When the cyclist operates the brake, the shoe 17 is pressed against the sliding surface 5*b* in conjunction with it, so that the braking force acts on the cage 5. During the operation of the brake, input torque is not applied to the outer ring 2 because the motor is in a stop state, and the inner ring 3 idles due to reverse input torque in the normal rotational direction produced by the inertia rotation of the wheel. In acting the braking force on the cage 5 in this state, the rotation of the cage 5 delays against the elastic force of the elastic member, and the cage 5 relatively rotates in the direction opposed to the inner ring 3. As a result, as shown in FIG. 5, the rollers 4, released from the narrow portions in the normal rotational direction in the wedge clearance 14, are caused to be engaged with the narrow portions in the reverse rotational direction, and are caused to be engaged with the outer ring 2 and the inner ring 3 in a wedge-like manner, in order to lock them in the reverse rotational direction (this state is hereinafter called "a reverse rotation locked state"). In the reverse rotation locked state, input torque in the reverse rotational direction from the output ring 2 is mechanically transmitted to the inner ring 3, and reverse input torque in the normal rotational direction from the inner ring 3 is transmitted to the outer ring 2. Input torque or reverse input torque in the other direction is not transmitted because the wedge-like engagement is released.

Then, the concrete structure of motor units 107 in which the above clutch unit 1 is installed will be described in examples 1 to 3. In any of the examples, there are a human-powered drive system for transmitting a pedal force applied to the pedal 100 (refer to FIG. 1) to the axle shaft 106 of the rear wheel 105, and a motor drive system for transmitting output from a motor 114 to the axle shaft 106 of the rear wheel 105.

EXAMPLE 1

Figure 6A:
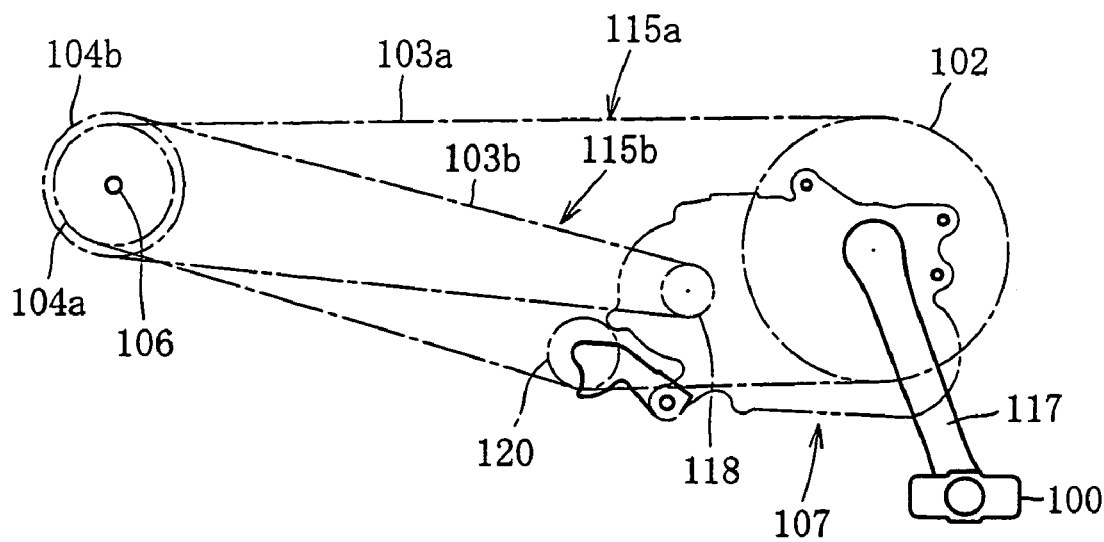
FIGS. 6(a) and 6(b) are a side view and a top plan view, respectively, showing an example of a drive section of an electric assisted bicycle in which the clutch unit is installed.
Figure 6B:
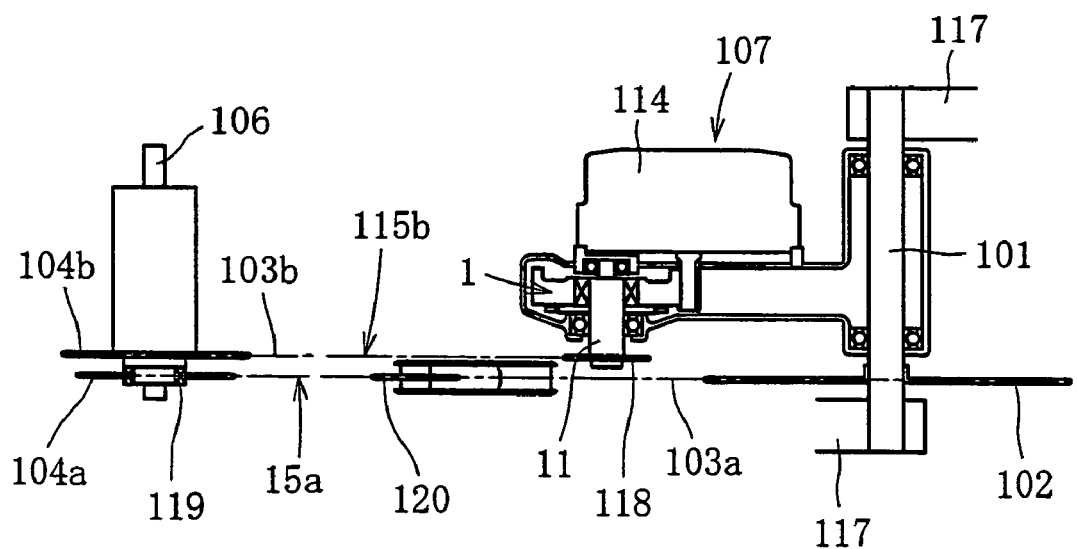

In the example 1 shown in FIGS. 6(*a*) and (*b*), the pedal force of the human-powered drive system and the motor output of the motor drive system are combined in the axle shaft 106, which is nearer to an output side than transmission means 115.

According to the example 1, in the human-powered drive system, the pedal force acting on the pedal 100 is converted into the rotational movement of the crank shaft 101 in the crank 117, and the torque thereof is transmitted to the axle shaft 106 of the rear wheel 105 via first transmission means 115*a*. The first transmission means 115*a* comprises a front sprocket 102 attached to the crank shaft 101, a rear sprocket 104*a* attached to the axle shaft 106 of the rear wheel 105, and a chain 103*a* put on both the sprockets 102 and 104*a*. The rear sprocket 104*a* and the axle shaft 106 are coupled freely via a well-known one way clutch 119 (a ratchet mechanism may be used instead of a wedge engagement type, and so forth), so as not to transmit reverse input torque from the axle shaft 106 to the rear sprocket 104*a*, though they transmit torque from the rear sprocket 104*a* to the axle shaft 106.

In the motor drive system, the output of the motor 114 is inputted to the above clutch unit 1, and the output of the clutch unit 1 is transmitted to the axle shaft 106 of the rear wheel 105 via second transmission means 115*b*. The second transmission means 115*b* comprises a middle sprocket 118 attached to the output shaft 11 of the clutch unit 1, a rear sprocket 104*b* attached to the axle shaft 106 of the rear wheel 105, and a chain 103*b* put on both the sprockets 118 and 104*b*. The rear sprocket 104*b* and the axle shaft 106 are coupled rigidly so as to transmit torque in both directions between the rear sprocket 104*b* and the axle shaft 106.

As described above, the two chains are put on in the example 1, but this structure has a possibility that looseness occurs in the chain 103*a* of the human-powered drive system when the chain 103*b* of the motor drive system has proper tension. To absorb the looseness, it is preferable to dispose a tensioner 120 in the chain 103*a* of the human-powered drive system.

Torque detection means is disposed in the crank shaft 101 to detect the shaft torque thereof, though it is not illustrated in the drawings. The torque detection means, which comprises, for example, a magnetic strain sensor coaxially disposed around the crank shaft 101, makes it possible to precisely detect torque in compact and simple structure.

Then, the relation between a cycling state and a working state of the clutch unit 1 according to the example 1 will be described.

During cycling with the motor assist, the clutch unit 1 is in the normal rotation locked state shown in FIG. 4. Thus, input torque in the normal rotational direction from the motor 114 is transmitted to the rear sprocket 104*b* through the channel of an input gear 9, a bush 8, an outer ring 2, rollers 4, an inner ring 3, and the output shaft 11. Since this motor torque is combined with pedal force torque from the human-powered drive system in the axle shaft 106, the cyclist can friskily ride the bicycle.

During cycling without the motor assist, on the other hand, rotational torque in the normal rotational direction due to the inertia rotation of the rear wheel 105 is reversely inputted from the output shaft 11 to the clutch unit 1, but the reverse input torque in the normal rotational direction is not transmitted to the outer ring 2 because of the disengagement of the rollers 4, as described above, so that the inner ring 3 idles. Therefore, when the bicycle coasts, the motor 114 is not driven, and there is no increase in torque due to the internal friction of the motor 114, and hence the cyclist can friskily ride the bicycle as with an ordinary bicycle without the motor assist.

Figure 5:
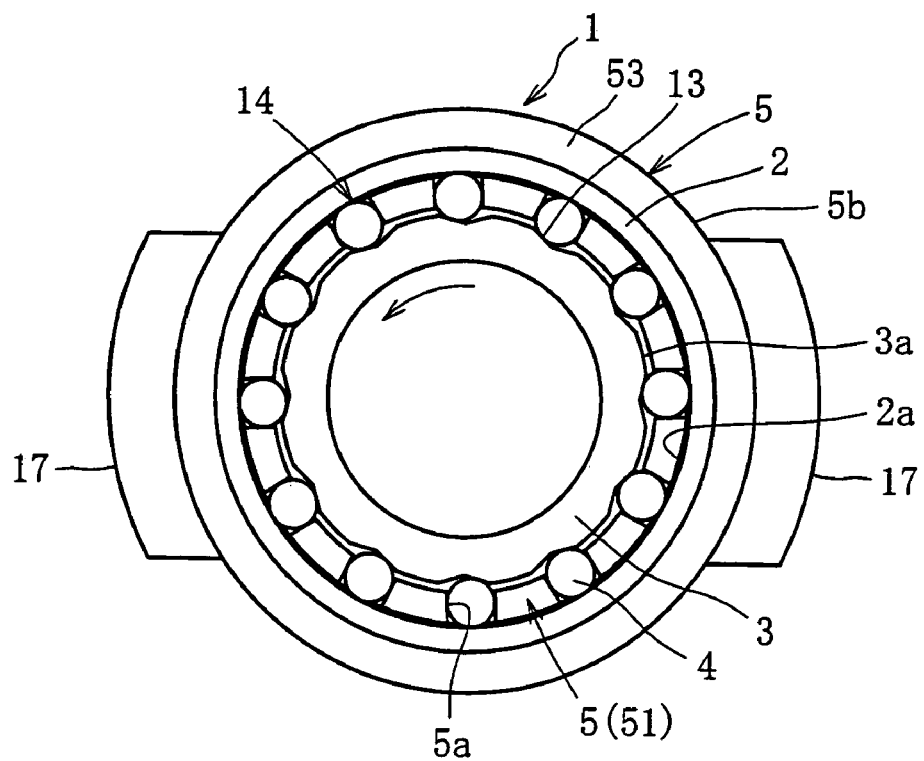
FIG. 5 is a sectional view in the radial direction showing the brake assist state of the clutch unit.

When the cyclist operates the brake, pressing the shoe 17 against the sliding surface 5*b* in conjunction therewith switches the lock direction of the clutch unit 1, and the clutch unit 1 is in the reverse rotation locked state shown in FIG. 5. In this state, since the motor 114 stops, input torque is not applied to the outer ring 2. The rotational torque of the rear wheel 105, on the other hand, acts on the output shaft 11 of the clutch unit 1 via the rear sprocket 104*b*, which is rigidly coupled to the axle shaft 106, and the chain 103*b*. The reverse input torque is inputted to the motor 114 through the channel of the output shaft 11, the inner ring 3, the rollers 4, the outer ring 2, the bush 8, and the input gear 9, because the rollers 4 are engaged in the wedge clearance in the reverse rotational direction. The torque drives the motor 114 to regeneratively generate electric power, and hence it is possible to charge a battery 110 with regenerative current.

At the same time, since the motive power for driving the motor 114 becomes the braking force, the function of assisting the brake operation is obtained (brake assist). Thus, since light force can produce powerful braking action, it is possible to actualize high braking performance which is in balance with improvement in cycling performance by the motor assist in a high order. If the cyclist has a weaker grip than able-bodied people, light force can produce sufficient braking force, so that the present invention can contribute to the safe and comfort cycling of a person with this type of impairment.

The advantages of the structure of the example 1 are to have simple structure inside the motor unit 107, to be applicable to a multistage transmission installed in the axle shaft 106 and the like.

EXAMPLE 2

Figure 7A:
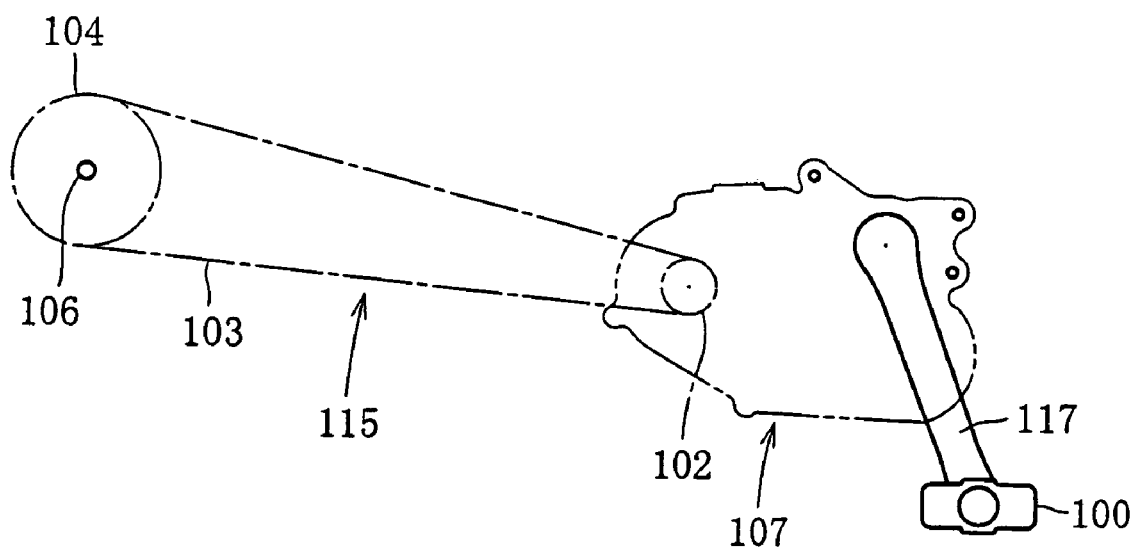
FIGS. 7(a) and 7(b) are a side view and a top plan view, respectively, showing another example of a drive section of an electric assisted bicycle in which the clutch unit is installed.
Figure 7B:
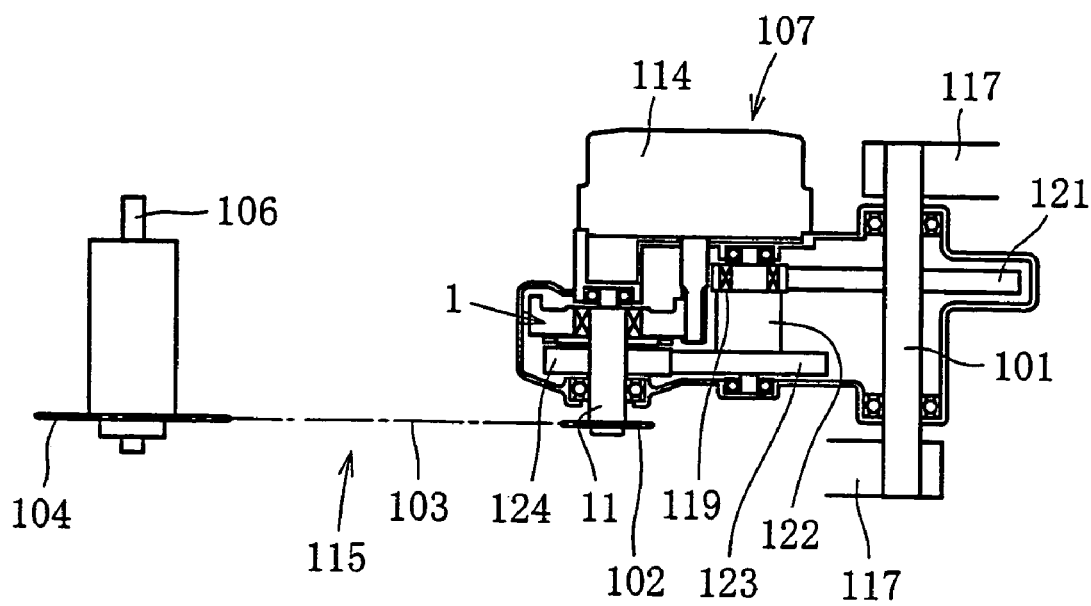

In the example 2 shown in FIGS. 7(*a*) and (*b*), the pedal force of the human-powered drive system and the motor output of the motor drive system are combined in the motor unit 107 which is nearer to an input side than transmission means 115. In other words, combined driving force is outputted from the common sprocket 102, instead of disposing the sprockets 102 and 118 at the ends of the human-powered drive system and the motor drive system, respectively, as in the cases of the above example 1 and an example 3 described later.

Specifically, in the human-powered drive system, the pedal force applied to the pedal 100 is transmitted to the output shaft 11 of the clutch unit 1 through the channel of a large gear 121, the one way clutch 119, a transmission 122, a transmission gear 123 and an output gear 124, and is combined with the motor output of the motor drive system transmitted from the input gear 9 of the clutch unit 1 to the output shaft 11. Combined driving force is transmitted to the axle shaft 106 of the rear wheel 105 via transmission means 115, which comprises the front sprocket 102 attached to the output shaft 11, the chain 103, and the rear sprocket 104, in order to rotate the rear wheel 105. The rear sprocket 104 and the axle shaft 106 are coupled rigidly so as to transmit torque in both directions between the sprocket 104 and the axle shaft 106.

Since the relation between a cycling state and a working state of the clutch unit 1 according to the example 2 is the same as that of the example 1, the description thereof is omitted. The advantages of the structure of the example 2 are to have simple exterior structure because a tensioner is unnecessary, to be able to secure favorable assembly performance by assembling the motor unit 107 in advance, and the like.

EXAMPLE 3

Figure 8A:
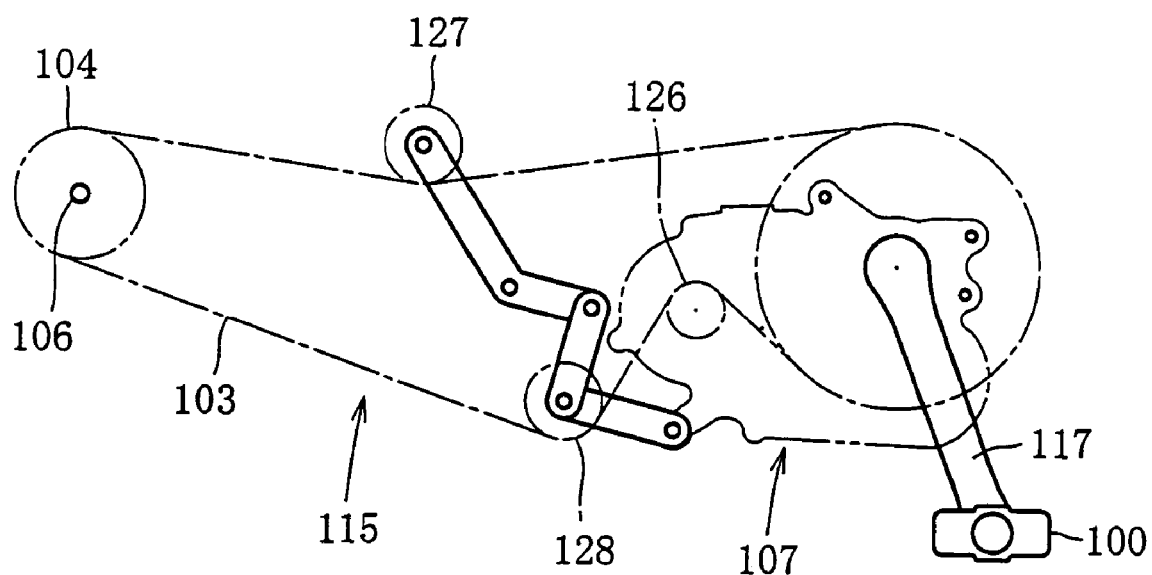
FIGS. 8(a) and 8(b) are a side view and a top plan view, respectively, showing further another example of a drive section of an electric assisted bicycle in which the clutch unit is installed.
Figure 8B:
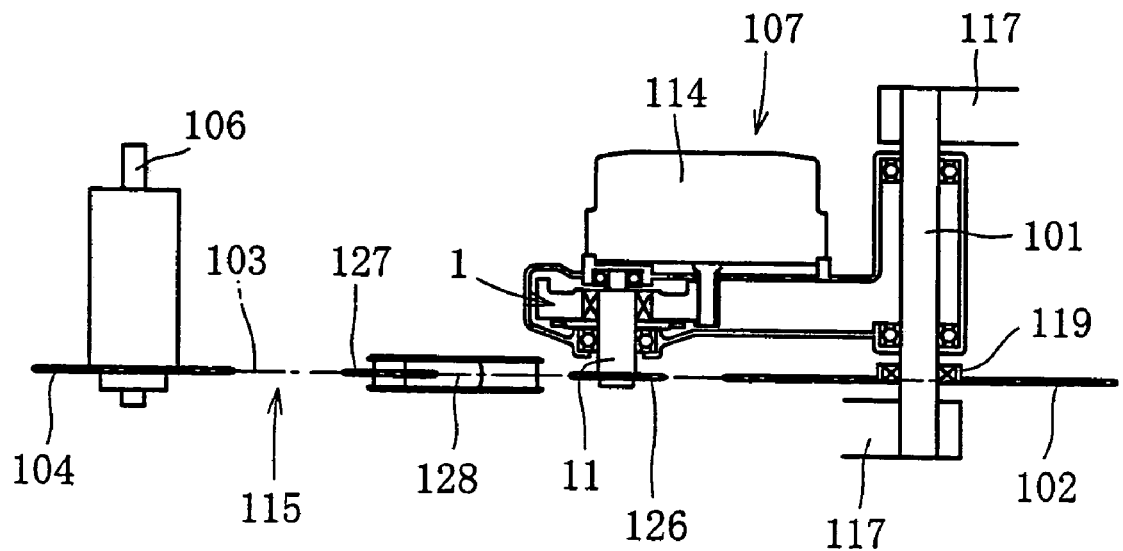

In the example 3 shown in FIGS. 8(*a*) and (*b*), the pedal force of the human-powered drive system and the motor output of the motor drive system are combined in transmission means 115.

According to the example 3, in the human-powered drive system, the pedal force applied to the pedal 100 is transmitted to the axle shaft 106 of the rear wheel 105 through the channel of the crank shaft 101, the one way clutch 119, and the transmission means 115. In the motor drive system, the output of the motor 114 is inputted to the clutch unit 1, and the output of the clutch unit 1 is transmitted to the axle shaft 106 of the rear wheel 105 via the transmission means 115. The transmission means 115 comprises the front sprocket 102 attached to the crank shaft 101, a middle sprocket 126 attached to the output shaft 11 of the clutch unit 1, the rear sprocket 104 attached to the axle shaft 106 of the rear wheel 105, and the chain 103 put on the sprockets 102, 126 and 104. The rear sprocket 104 and the axle shaft 106 are coupled rigidly so as to transmit torque in both directions between the sprocket 104 and the axle shaft 106.

A first tensioner 127 for biasing the chain 103 from above is disposed in a part of the chain 103 on a stretched side during normal rotation (a rotational direction while the cyclist pedals). In a loose side, the middle sprocket 126 biases the chain 103 from beneath, and a second tensioner 128 biases the chain 103 from above.

Since the relation between a cycling state and a working state of the clutch unit 1 according to the example 3 is the same as that of the example 1, the description thereof is omitted. The advantages of the structure of the example 3 are to have simple structure inside the motor unit 107, to have good mechanical efficiency because of an inline system and the small number of reduction processes, to be also applicable to a multistage transmission attached to the outside of the axle shaft 106 of the rear wheel, and the like.

Figure 9:
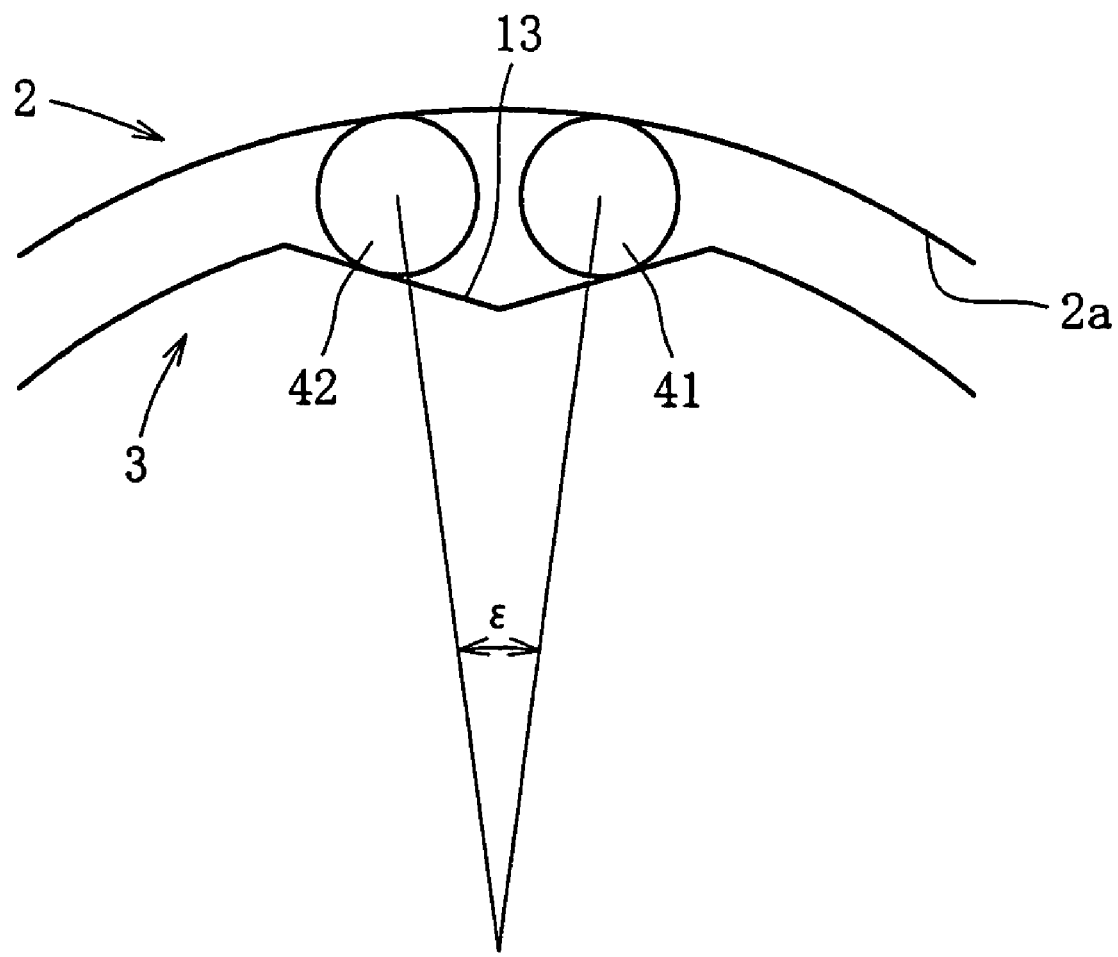
FIG. 9 is an enlarged sectional view in the radial direction which shows the vicinity of a cam face of the clutch unit.

By the way, generally when the chains 103, 103*a*, and 103*b* rotate, the speed variation of the chains cannot be avoided. Especially when the speed variation occurs in the chain 103 or 103*b* of the motor drive system, the rollers 4 in the normal rotation locked state (FIG. 4) suddenly moves to the positions of the reverse rotation locked state (FIG. 5), and hence switching from a motor assist state to a brake assist state may interfere with smooth cycling. To prevent such a situation, as shown in FIG. 9, it is preferable that the angle $\epsilon$ between the position of a roller 41 in the normal rotation locked state (standby position) and the position of a roller 42 in the reverse rotation locked state (standby position) is equal to or more than 5 degrees.

In the above examples 1 to 3, a chain-sprocket type of transmission means 115, 115*a* or 115*b* is used, but another transmission type such as a belt drive type or a shaft drive type of transmission means is adoptable instead.

In the clutch unit 1 shown in FIGS. 2 to 5, the stopped motor is abruptly rotated upon switching the lock direction, that is, upon switching from the normal rotation locked state shown in FIG. 4 to the reverse rotation locked state shown in FIG. 5. In this case, since an impulsive load is imposed to a component which is nearer to an input side than the input gear, for example, to the motor 114, the necessity of measures against the impulsive load in each component may cause increase in cost.

Figure 10:
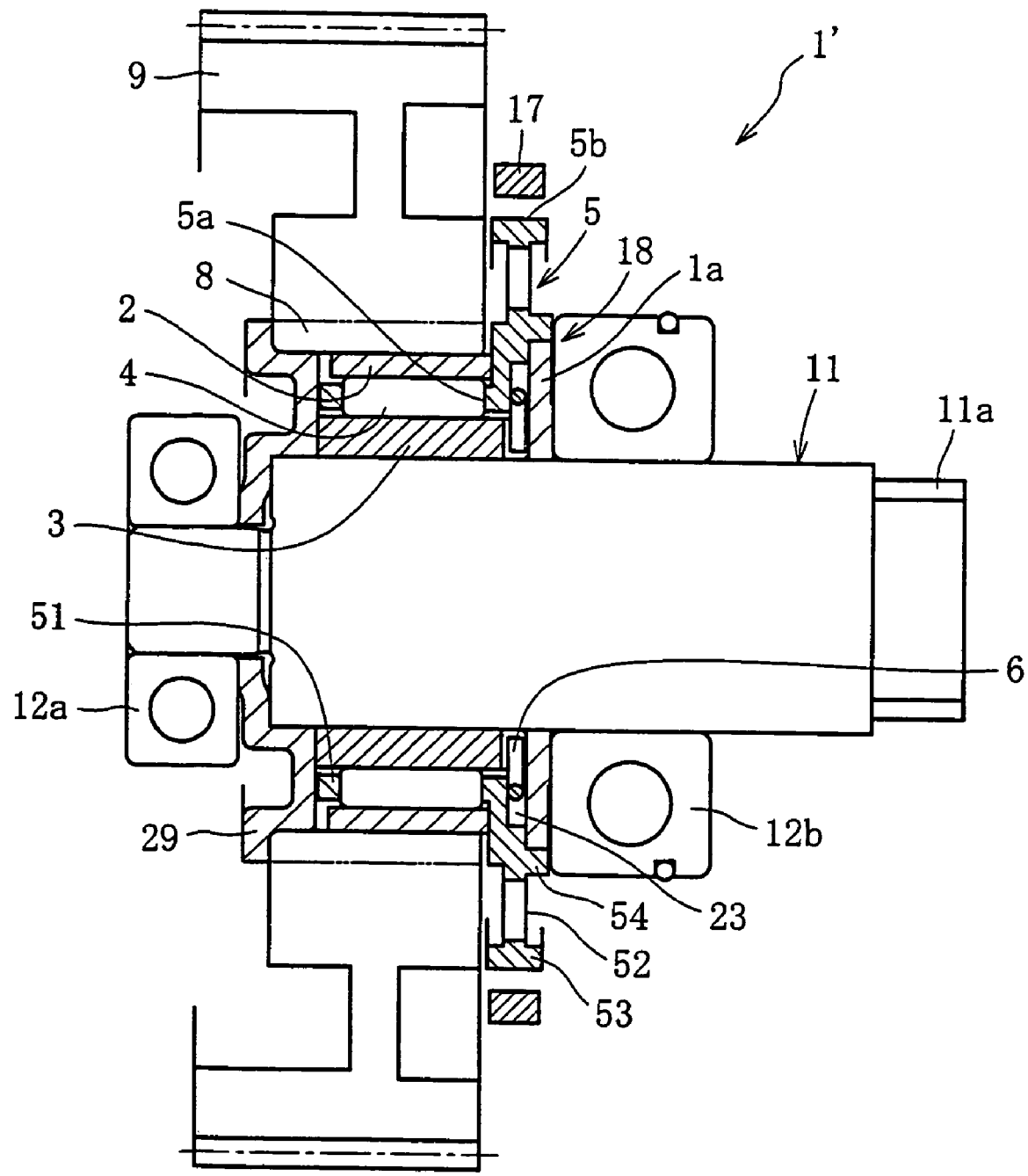
FIG. 10 is a sectional view in an axial direction showing a clutch unit according to another embodiment.
Figure 11:
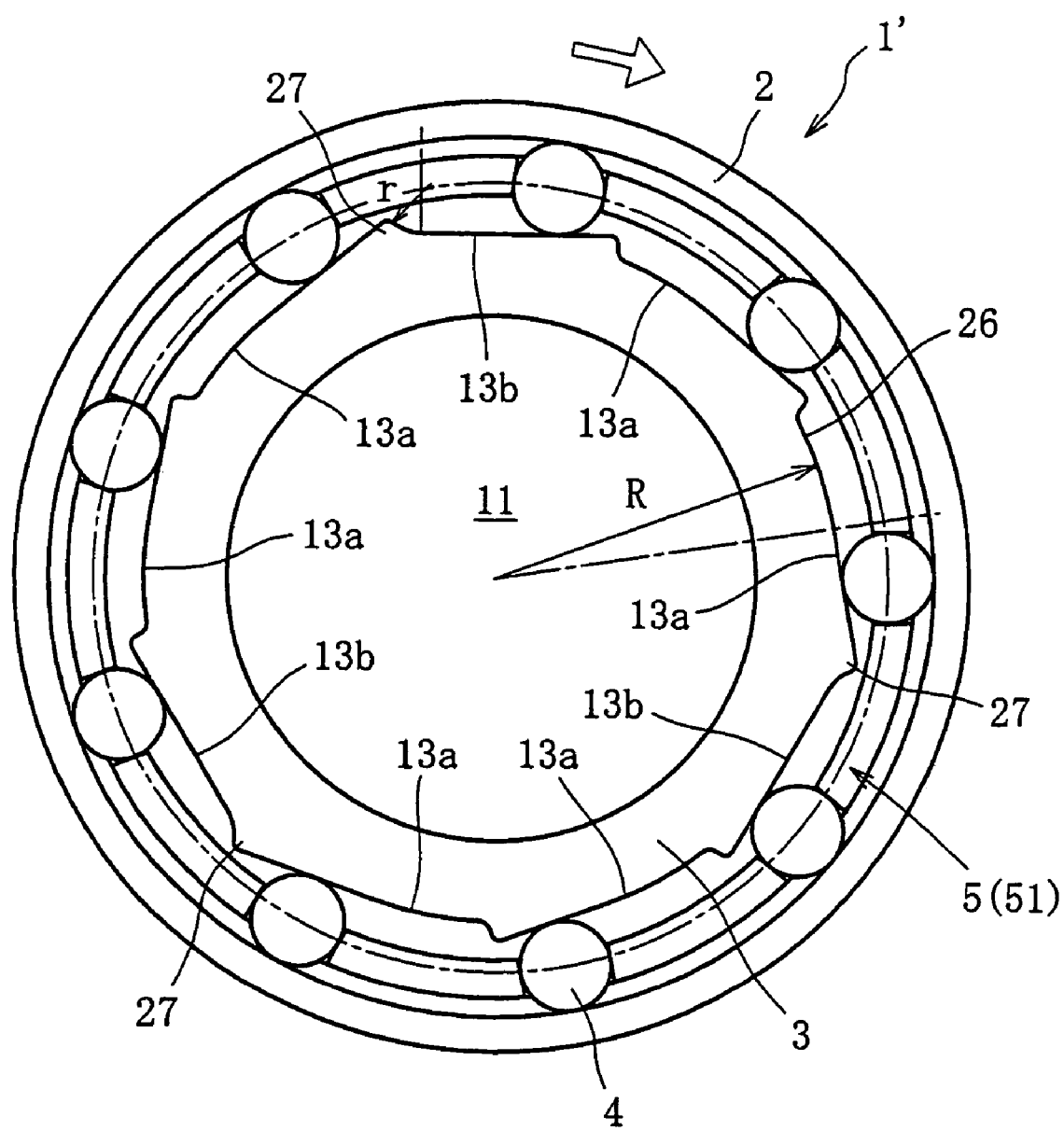
FIG. 11 is a sectional view in a radial direction showing the motor assist state of the clutch unit.
Figure 12:
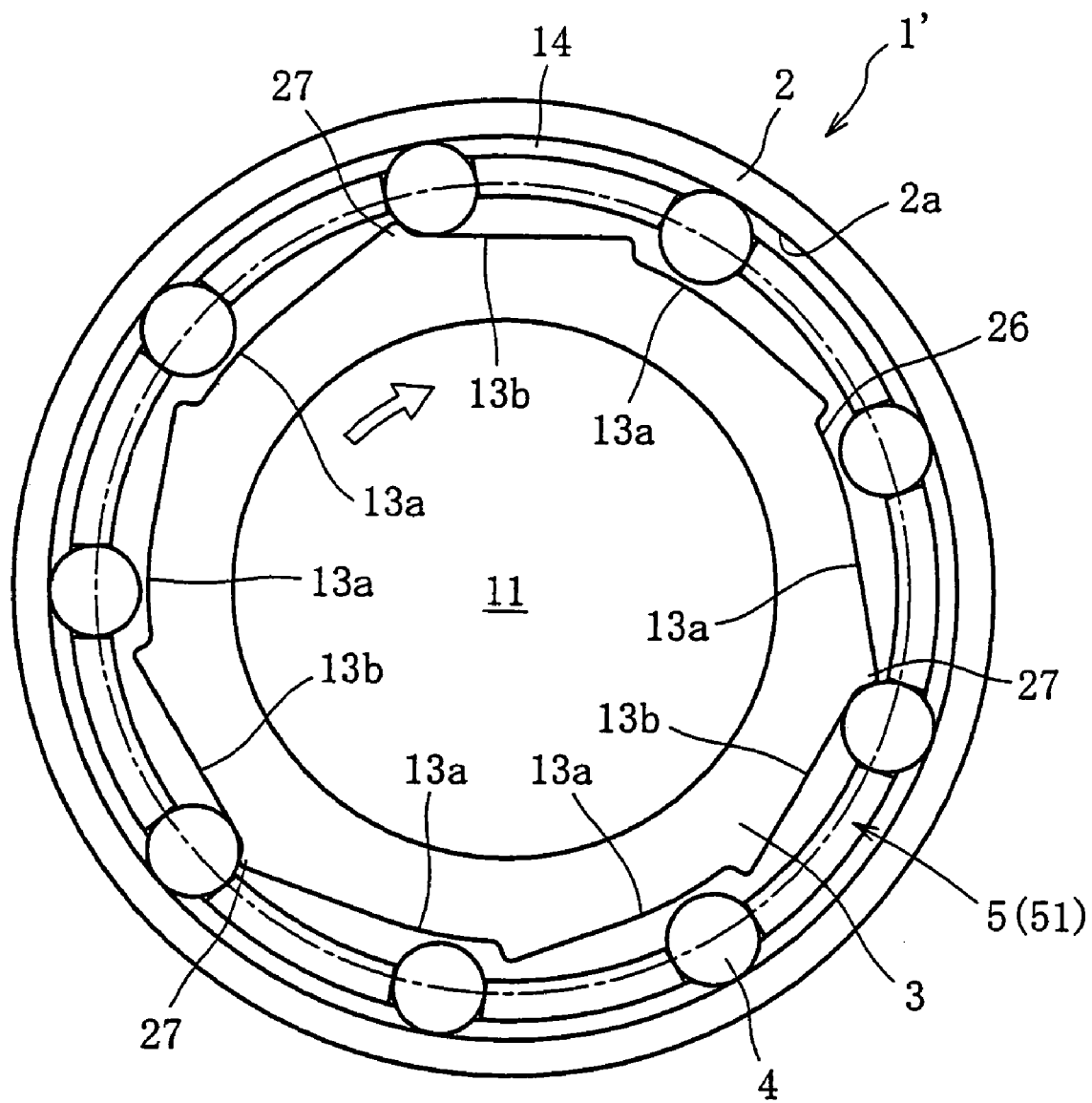
FIG. 12 is a sectional view in the radial direction showing the brake assist state of the clutch unit.

FIGS. 10 to 12 shows another embodiment (the second embodiment) of a clutch unit 1' to which this type of measures against an impulsive load is taken. Since the basic structure and action of the clutch unit 1' are the same as those of the clutch unit 1 of the first embodiment described on the basis of FIGS. 2 to 5, components identical to those of the clutch unit 1 according to the first embodiment denotes the same reference numerals as those in the first embodiment. Explanation thereof is omitted, and differences are mainly described.

The main difference between the clutch unit 1' according to the second embodiment and the clutch unit 1 according to the first embodiment is the shape of the cam face 13. In other words, every cam face 13 is in the same shape in the clutch unit 1 according to the first embodiment, but the clutch unit 1' according to the second embodiment has two types of cam faces 13*a* and 13*b* having different shapes.

Referring to FIG. 11, one cam face 13*a* (the first cam face) has a flat face portion in an area on a normal rotational direction side, that is, in an area where the roller 4 moves during the motor assist (the state of FIG. 4), and a narrow portion of wedge clearance is formed between the cam face 13*a* and the inner periphery 2*a* of the outer ring 2 only in that direction. In an area on a reverse rotational direction side of the first cam face 13*a*, an escape portion 26, which is a convex curved surface of a radius of "R", is formed in such a manner as to be smoothly continued from the flat face portion, and the width of the clearance partitioned by the escape portion 26 and the inner periphery 2*a* of the outer ring 2 is larger than the diameter of the roller 4. Therefore, the rollers 4 are not engaged with the outer ring 2 and the inner ring 3 in a wedge-like manner, and are rotatable in the escape portions 26.

The other cam face 13b (the second cam face), taking the shape of a flat face on the whole, forms the narrow portions of the wedge clearance in both the normal and reverse rotational directions between the-cam face 13b and the inner periphery 2a of the outer ring. At the end portion on the reverse rotational direction side of the second cam face 13b, a stopper portion 27, protruding to have the shape of a concave curved surface of a radius of "r", is formed in such a manner as to be smoothly continued from a flat portion.

According to the structure described above, in the clutch unit 1', as shown in FIG. 11, all the rollers 4 are displaced in the normal rotational direction by the elastic force of the not-illustrated elastic member (the reference numeral 6 in FIG. 2) during the motor assist, and are caused to be engaged with the outer ring 2 and the inner ring 3 in a wedge-like manner in order to lock them in the normal rotational direction. Therefore, the torque of the motor 114 inputted to the outer ring 2 is transmitted to the output shaft 11, and is further transmitted to the axle shaft 106 of the rear wheel 105.

Figure 13:
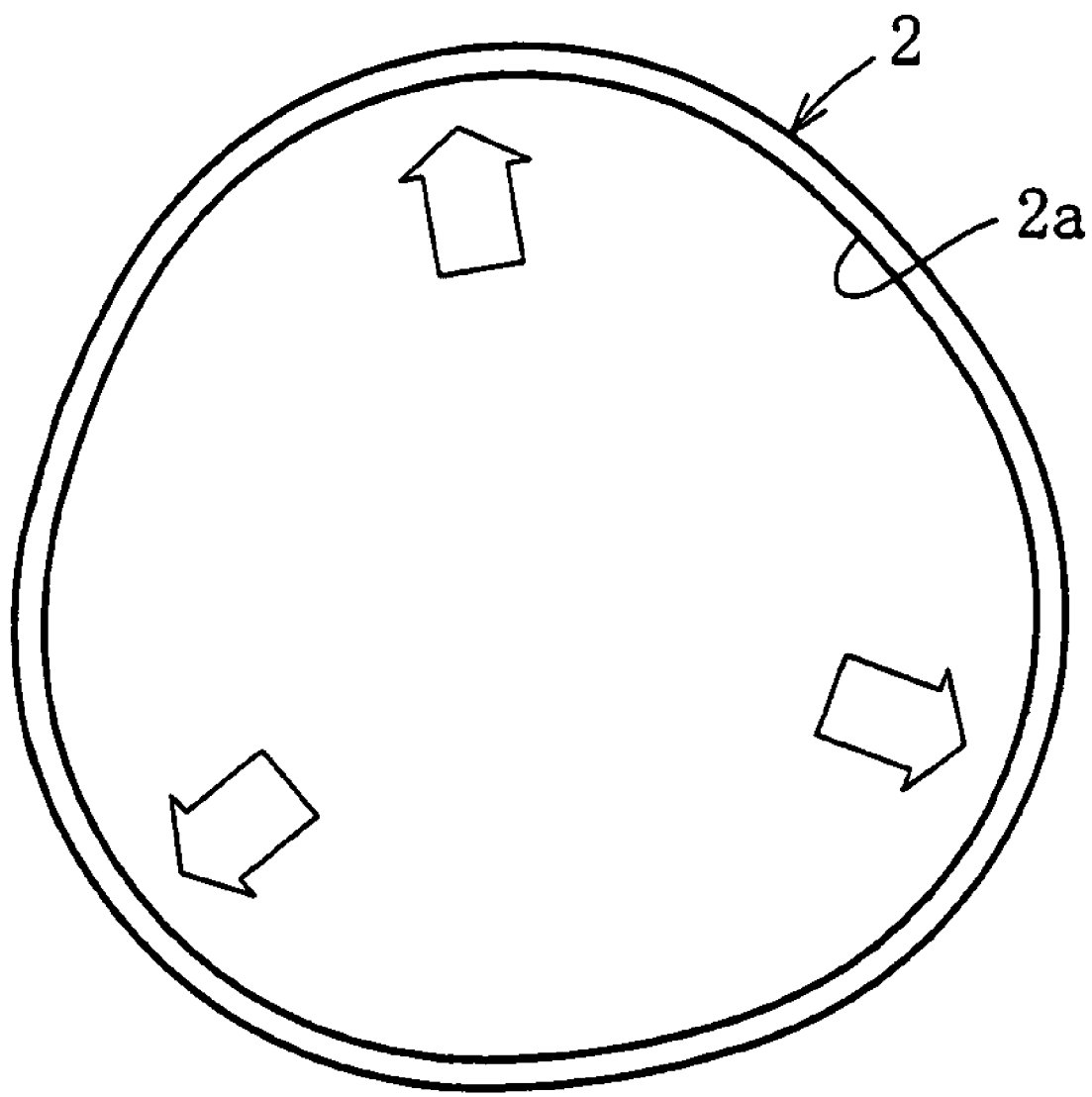
FIG. 13 is a top plan view of a deformed outer ring.

Upon operating the brake, on the other hand, as shown in FIG. 12, the rollers 4 leave the narrow portions in the normal rotational direction and move in the reverse rotational direction due to delay in rotation occurring in the cage 5. In response to it, the rollers 4 entering the area of the escape portions 26 are not engaged with the outer ring 2 and the inner ring 3 in a wedge-like manner, and become rotatable in the wedge clearance 14 formed by the first cam faces 13a. In the wedge clearance 14 formed by the second cam faces 13b, on the other hand, the rollers 4 are caused to be engaged with the outer ring 2 and the inner ring 3 in a wedge-like manner, the outer ring 2 and the inner ring 3 are locked in the reverse rotational direction. In this case, only the rollers 4 in the wedge clearance 14 formed by the second cam faces 13b have the load of torque, and the rollers 4 in the wedge clearance 14 formed by the first cam faces 13a lose the load of torque. Therefore, as shown in FIG. 13, the lack of the load of torque in the whole clutch unit 1' deforms the outer ring 2 from a perfect circle to a distorted triangle by normal force (the degree of distortion of the outer ring 2 is exaggerated in FIG. 13 for ease of understanding). It is preferable that the outer ring 2 is made of thin steel material having low bending stiffness to smoothly deform the outer ring 2, and the bush 8 and the inner gear 9 are made of, for example, resin material or the like having a higher elastic modulus than the steel material, in order to reduce the force of constraint against the deformation of the steel outer ring 2 from the side of an outer diameter.

In response to the deformation of the outer ring 2, the rollers 4 in the wedge clearance 14 formed by the second cam faces 13b make contact with the stopper portions 27 of the second cam faces 13b, and are pushed up on the outer diameter side by the guide of the stopper portions 27, so that the outer ring 2 takes a more conspicuously distorted rectangular shape. In response to it, as shown in FIG. 14, when a cam angle θ refers to a cam angle before the roller 4 reaches an area formed by the stopper 27, a cam angle β becomes larger than the cam angle θ (cam angle in a standby position), and exceeds a lock angle after a while (shown by alternate long and short dashed lines in the drawing). Here, the term "cam angle" refers to the crossing angle of tangents to the roller 4 which pass through the contact points between the roller 4 and the outer ring 2 and between the roller 4 and the inner ring 3 (in this embodiment, contact points between the roller 4 and the inner periphery 2a of the outer ring and between the roller 4 and the second cam face 13b), and the term "lock angle" refers to a cam angle at which the disengaged roller 4 starts sliding relative to the surface of the outer ring 2 or the inner ring 3 (in this embodiment, the inner periphery 2a of outer ring). In an ordinary clutch, the lock angle is set at 12 degrees or more and 15 degrees or less.

When the cam angle β becomes large and exceeds the lock angle as a clutch like this, the rollers 4 being in contact with the stopper portions 27 start sliding relative to the inner periphery 2a of the outer ring 2, and the lock function by the rollers 4 between the outer ring 2 and the inner ring 3 is lost. Thus, the motor 114 starts slowly rotating without receiving any impulsive load. When the motor starts rotating, since the outer ring 2 elastically returns to an original shape, the cam angle becomes small, and hence the engagement of the rollers 4 with the outer ring 2 and the inner ring 3 in a wedge-like manner restores a function as a clutch. Therefore, reverse input torque is transmitted to the motor 114, and electric power generation and brake assist are smoothly carried out after this.

As described above, the clutch unit 1' according to the second embodiment has a function as a torque limiter which prevents reverse input torque of a predetermined value or more from being inputted during the brake assist. This predetermined value depends on the deformation strength of the outer ring 2, the r-dimension of the stopper portion 27, the standby position of the roller 4 and the like. Therefore, in other words, the predetermined value is set at an arbitrary value by properly changing the design situations of them.

As being apparent from the foregoing explanation, it is preferable that the outer ring 2 is smoothly deformable, and the number of the second cam faces 13b is small to realize smooth deformation. From this point of view, in FIGS. 11 and 12, of the nine cam faces 13a and 13b in total, there are the three second cam faces 13b, and the two first cam faces 13a are disposed between the second cam faces 13b. As a matter of course, the number and disposition of the cam faces 13a and 13b are not limited to it.

Besides, as shown in FIG. 10, the bearing member 16 and the washer 22 are integrally formed (the reference numeral 29 refers to this member) to reduce the number of parts in the clutch unit 1' according to the second embodiment, as distinct from the clutch unit 1 according to the first embodiment, but the same structure as this is applicable to the clutch unit 1 shown in FIG. 2.

According to the present invention, it is possible to provide an electric assisted bicycle having the functions of motor assist, brake assist, and electric power regeneration. Since these functions are realized by newly adding a single clutch unit, it is possible to miniaturize the motor unit, and reduce the cost thereof. Furthermore, since the clutch unit uses the wedge action of engaging elements, the stability, reliability, and certainty of operation are increased.

What is claimed is:

1. An electric assisted bicycle configured so that a pedal force transmitted from a crank shaft and an output of a motor are transmitted to an axle shaft, wherein a clutch unit which can switch a lock direction in conjunction with a brake operation by a cyclist is coupled to an output shaft of the motor.

2. The electric assisted bicycle according to claim 1, wherein the crank shaft is coupled to the axle shaft via first transmission means, and an output shaft of the clutch unit is rigidly coupled to the axle shaft via second transmission means.

3. The electric assisted bicycle according to claim 2, wherein a one way clutch is interposed between the first transmission means and the axle shaft.

4. The electric assisted bicycle according to claim 1, wherein the output shaft of the clutch unit is rigidly coupled to the axle shaft via transmission means, and the crank shaft is coupled to the output shaft of the clutch unit.

5. The electric assisted bicycle according to claim 4, wherein a one way clutch is interposed between the crank shaft and the output shaft of the clutch unit.

6. The electric assisted bicycle according to claim 1, wherein the output shaft of the clutch unit is rigidly coupled to the axle shaft via a transmission means, and the crank shaft is coupled to the axle shaft via said transmission means.

7. The electric assisted bicycle according to claim 6, wherein a one way clutch is interposed between the crank shaft and the transmission means.

8. The electric assisted bicycle according to any one of claims 1 to 7, wherein the clutch unit comprises: an input side member to which motor torque in a normal rotational direction is inputted; an output side member to which the torque is outputted; a plurality of engaging elements each disposed between the input side member and the output side member; and a plurality of cam faces which cause each engaging element to be engaged with the input side member and the output side member in a wedge-like manner, so as to switch the lock direction of the clutch unit from the normal rotational direction to a reverse rotational direction in conjunction with the brake operation by the cyclist.

9. The electric assisted bicycle according to claim 8, wherein the lock direction of the clutch unit is switched by holding the engaging elements of the clutch unit by a cage and applying a delay in rotation to the cage in conjunction with the brake operation by the cyclist.

10. The electric assisted bicycle according to claim 9, wherein the engaging elements are constantly biased to the normal rotational direction with an elastic force applied to the cage.

11. The electric assisted bicycle according to claim 8, wherein the plurality of cam faces of the clutch unit causes the engaging elements to be engaged with the input side member and the output side member in both normal and reverse rotational directions in a wedge-like manner.

12. The electric assisted bicycle according to any one of claims 1 to 7, wherein the clutch unit is one which transmits a reverse input torque from an output side to an input side when the reverse input torque from the output side is equal to, or less than, a predetermined value and interrupts a transmission of torque from the output side to the input side when the reverse input torque exceeds the predetermined value.

13. The electric assisted bicycle according to claim 8, wherein the clutch unit is one which transmits a reverse input torque from an output side to an input side when the reverse input torque from the output side is equal to, or less than, a predetermined value and interrupts a transmission of torque from the output side to the input side when the reverse input torque exceeds the predetermined value.

14. The electric assisted bicycle according to claim 13, wherein the plurality of cam faces of the clutch unit comprises first cam faces which cause the engaging elements to be engaged with the input side member and the output side member in a wedge-like manner only in the normal rotational direction, and second cam faces which cause the engaging elements to be engaged with the input side member and the output side member in a wedge-like manner in both normal and reverse rotational directions.

15. The electric assisted bicycle according to claim 14, wherein the second cam faces are provided with stopper portions to make a cam angle equal to, or larger than, a lock angle when a reverse input torque in the reverse rotational direction exceeds a predetermined value.

16. The electric assisted bicycle according to claim 15, wherein the second cam faces are formed in one of the input side member and the output side member, and the other member is deformed by the engaging elements guided by the stopper portions to make the cam angle larger than the lock angle.

17. The electric assisted bicycle according to claim 11, wherein in the cam face for causing the engaging element to be engaged with the input side member and the output side member in a wedge-like manner in both normal and reverse rotational directions, the angle between a lock position of the engaging element in the normal rotational direction and a lock position of the engaging element in the reverse rotational direction is set at equal to, or more than, 5 degrees.

18. The electric assisted bicycle according to claim 13, wherein in the cam face for causing the engaging element to be engaged with the input side member and the output side member in a wedge-like manner in both normal and reverse rotational directions, the angle between the lock position of the engaging element in the normal rotational direction and the lock position of the engaging element in the reverse rotational direction is set at equal to, or more than, 5 degrees.

19. The electric assisted bicycle according to claim 14, wherein in the cam face for causing the engaging element to be engaged with the input side member and the output side member in a wedge-like manner in both normal and reverse rotational directions, the angle between the lock position of the engaging element in the normal rotational direction and the lock position of the engaging element in the reverse rotational direction is set at equal to, or more than, 5 degrees.

20. The electric assisted bicycle according to claim 15, wherein in the cam face for causing the engaging element to be engaged with the input side member and the output side member in a wedge-like manner in both normal and reverse rotational directions, the angle between the lock position of the engaging element in the normal rotational direction and the lock position of the engaging element in the reverse rotational direction is set at equal to, or more than, 5 degrees.

21. The electric assisted bicycle according to claim 16, wherein in the cam face for causing the engaging element to be engaged with the input side member and the output side member in a wedge-like manner in both normal and reverse rotational directions, the angle between the lock position of the engaging element in the normal rotational direction and the lock position of the engaging element in the reverse rotational direction is set at equal to, or more than, 5 degrees.

* * * * *

UNITED STATES PATENT AND TRADEMARK OFFICE
CERTIFICATE OF CORRECTION

PATENT NO. : 7,040,440 B2
APPLICATION NO. : 10/797611
DATED : May 9, 2006
INVENTOR(S) : Masahiro Kurita et al.

It is certified that error appears in the above-identified patent and that said Letters Patent is hereby corrected as shown below:

Title Page

In (73) Assignee Information, please add a second Assignee's name and address as follows:

-- Matsushita Electric Industries Co., Ltd., Osaka-fu, (JP) --.

Signed and Sealed this

Thirtieth Day of January, 2007

JON W. DUDAS
*Director of the United States Patent and Trademark Office*